US011904785B2

(12) United States Patent
Basu

(10) Patent No.: US 11,904,785 B2
(45) Date of Patent: Feb. 20, 2024

(54) CRASH-EVENT DRIVEN COLLAPSIBLE TRAY TABLES FOR AUTONOMOUS VEHICLES

(71) Applicant: GM Cruise Holdings LLC, San Francisco, CA (US)

(72) Inventor: Rajat Basu, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 328 days.

(21) Appl. No.: 17/400,898

(22) Filed: Aug. 12, 2021

(65) Prior Publication Data
US 2023/0052066 A1 Feb. 16, 2023

(51) Int. Cl.
*B60R 21/0136* (2006.01)
*B60N 3/00* (2006.01)
*B60R 21/01* (2006.01)

(52) U.S. Cl.
CPC .......... *B60R 21/0136* (2013.01); *B60N 3/002* (2013.01); *B60R 2021/01252* (2013.01)

(58) Field of Classification Search
CPC ...... B60R 21/0136; B60R 2021/01252; B60R 21/013; B60N 3/002
See application file for complete search history.

(56) References Cited

U.S. PATENT DOCUMENTS 11,465,578 B1 * 10/2022 Llamazares Domper .................. B60R 21/055
11,590,914 B1 * 2/2023 Llamazares Domper .................. B60N 2/06

FOREIGN PATENT DOCUMENTS

| DE | 102010040171 A1 * | 4/2011 | ............. B60N 3/002 |
| DE | 102019004022 A1 * | 12/2019 | |
| WO | WO-0047440 A1 * | 8/2000 | ............. B60N 2/468 |
| WO | WO-2016048220 A1 * | 3/2016 | ............. B60N 2/504 |

* cited by examiner

*Primary Examiner* — Drew J Brown
(74) *Attorney, Agent, or Firm* — Novak Druce Carroll LLP

(57) ABSTRACT

A safety apparatus may include a tray table coupled to an interior surface of a vehicle via a release mechanism. The safety apparatus may also include a collision detection system communicatively coupled to the release mechanism. The collision detection system is configured to engage with the release mechanism if the tray table is in an open position, and to de-couple the tray table from the interior surface of the vehicle or to break away the tray table from a portion of a tray table structure if a collision is detected with respect to the vehicle.

20 Claims, 10 Drawing Sheets

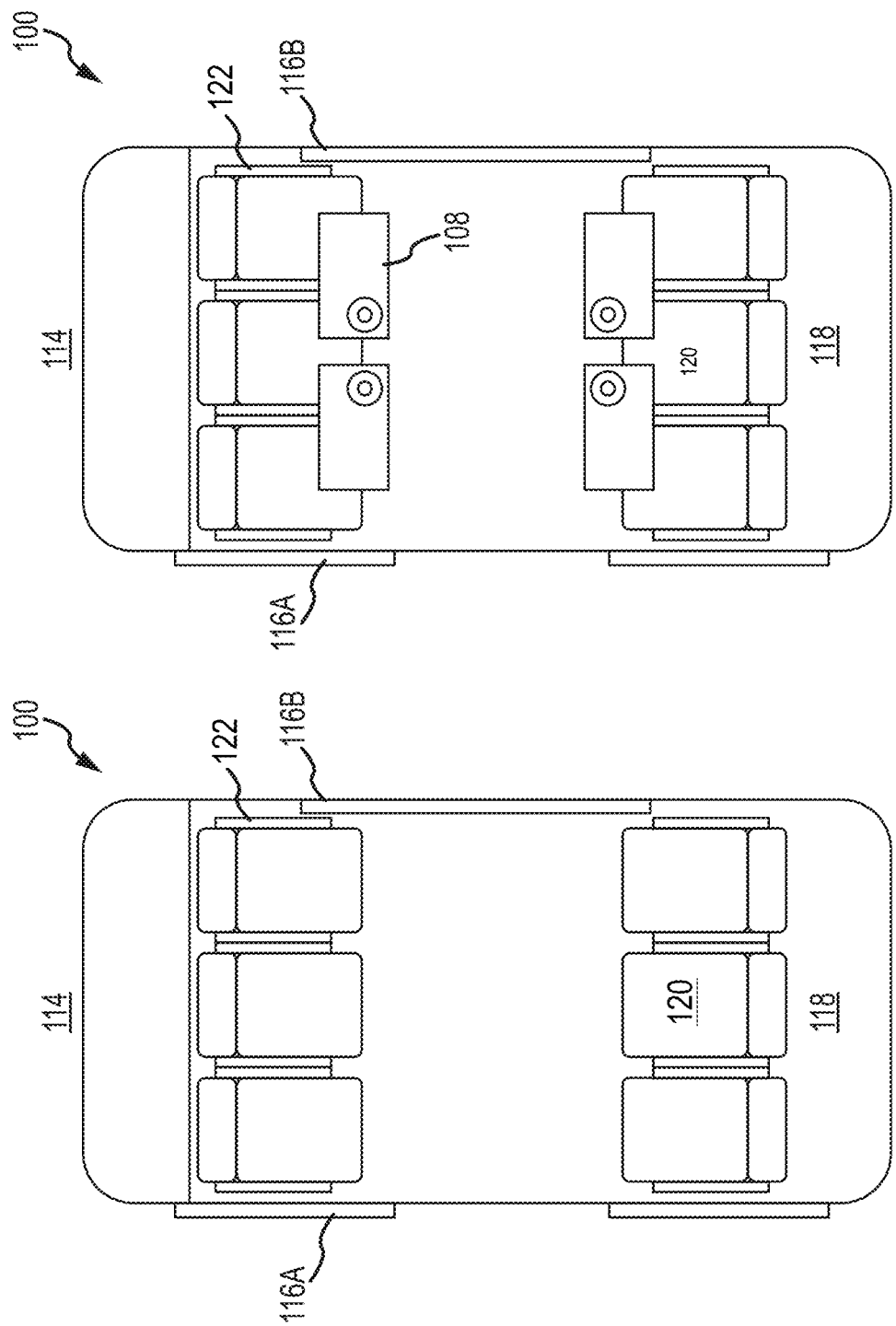

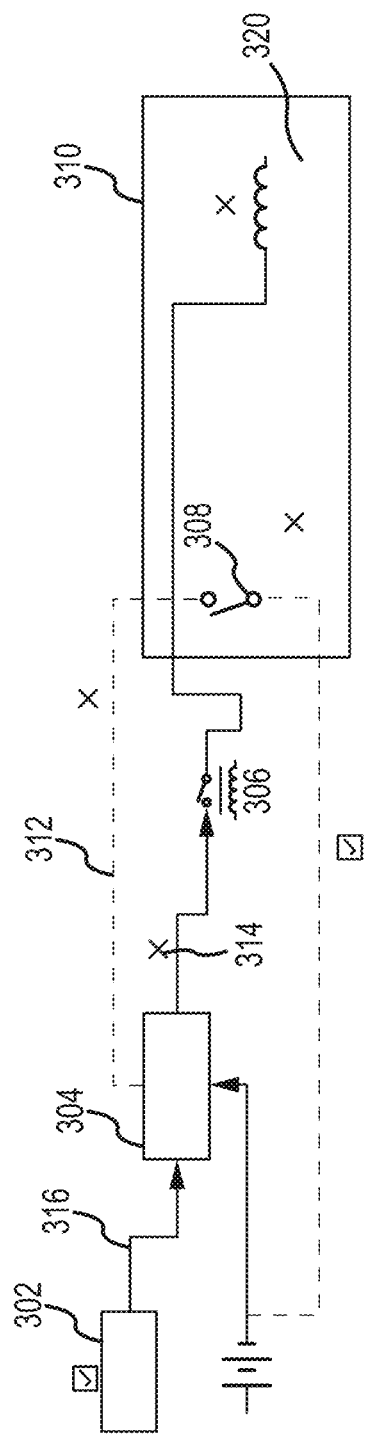
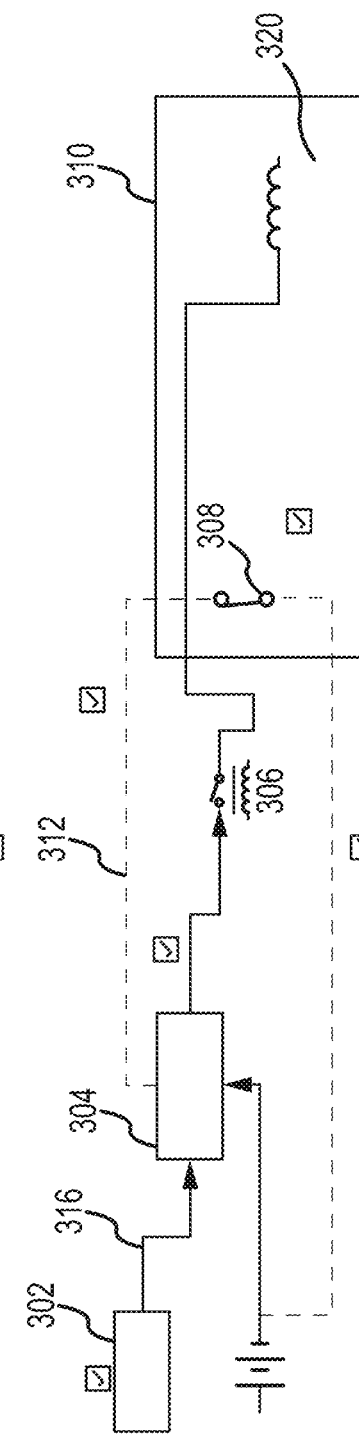
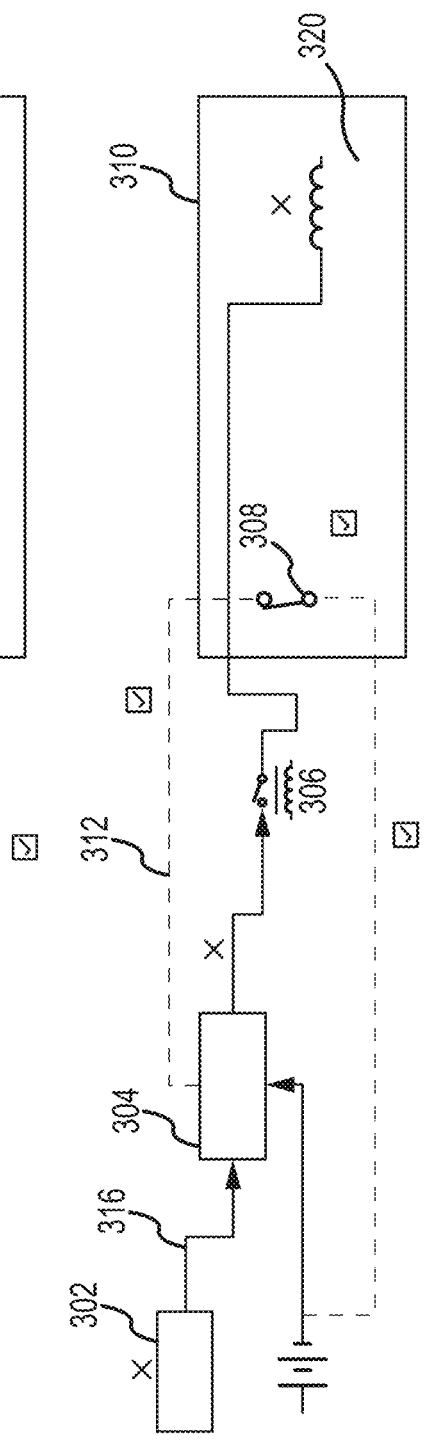
FIG.3A
FIG.3B
FIG.3C

CRASH-EVENT DRIVEN COLLAPSIBLE TRAY TABLES FOR AUTONOMOUS VEHICLES

TECHNICAL FIELD

The subject technology provides solutions for improving the safety of vehicle tray tables. In particular, the disclosure provides solutions for causing vehicle tray tables to collapse when a crash or collision event is detected.

BACKGROUND

An autonomous vehicle is a motorized vehicle that can navigate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 1C illustrates a top view of a vehicle with a tray table being deployed, according to some aspects of the disclosed technology;

FIG. 1D illustrates a top view of the vehicle with the tray tables of FIG. 1C being folded underneath the seat, according to some aspects of the disclosed technology;

FIG. 3A shows a logic of a circuitry for a first operational scenario of the safety apparatus, according to some aspects of the disclosed technology;

FIG. 3B shows a logic of a circuitry for a second operational scenario of the safety apparatus;

FIG. 3C shows a logic of a circuitry for a third operational scenario of the safety apparatus, according to some aspects of the disclosed technology;

DETAILED DESCRIPTION

Figure 1A:
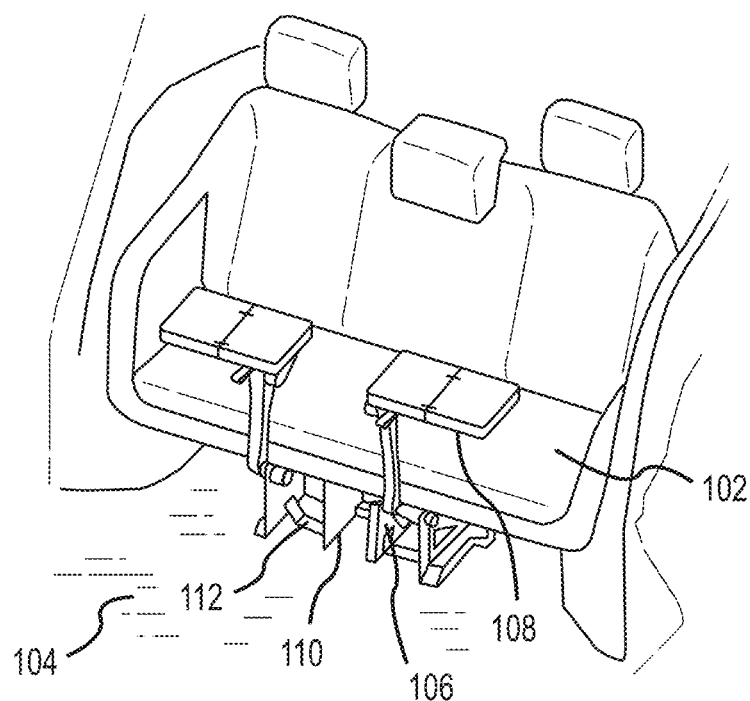
FIG. 1A illustrates a perspective view of a tray table being deployed in front of a seat of a vehicle, according to some aspects of the disclosed technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

Tray tables can be useful for vehicle passengers, providing a convenient space for the temporary placement of personal effects, such as laptops, books, and/or food items. For airborne vehicles such as airplanes, tray tables are commonly constructed of lightweight materials. However, for vehicles that typically experience greater turbulence, such as for land-based automobiles, tray tables can benefit from a heavier construction, for example, to dampen vibrations typically experienced during normal driving operations.

Once concern for tray tables generally, and heavier tray tables particularly, is that they can pose a safety risk in the event of a vehicle collision. Aspects of the disclosed technology address the foregoing concerns by providing safety mechanisms to reduce the likelihood of tray-table related passenger injuries.

In some aspects, the disclosed technology provides solutions for permitting deployed tray tables to break-away or collapse in the event of a detected collision, thereby reducing a likelihood of passenger injury due to a forceable impact. In some approaches, a detected collision event can cause the tray table to freely break-away, for example, by actuating a release mechanism that mechanically decouples the tray table from an anchoring surface, such as a seat, or console, etc. or breaks away the tray table from a portion of a tray table structure.

In some implementations, the safety system of the disclosed technology can include a collision detection system, such as airbag sensors and/or accelerators for sensing potential impact events, such as emergency braking or vehicle collisions, among others. The release mechanism for the tray table may be triggered or activated by a collision event or a crash event, an emergency stop, or a bump on the road.

The safety apparatus may also include a release mechanism coupled to the collision detection system. The tray table may automatically break away from a portion of a tray table structure through the release mechanism or may decouple from an interior surface of the vehicle when the crash event occurs. This can prevent the passenger behind the tray table from hitting the tray table and getting injured.

The safety apparatus may also include soft tray tables, which are much softer than rigid tray tables, as used in airplanes. The soft tray tables may prevent passengers from receiving injuries.

The safety apparatus includes soft tray tables in case the passengers hit the soft tray tables, where the damage to the passengers from the soft tray tables can be less than a rigid tray table.

FIG. 1A illustrates a perspective view of a tray table being deployed in front of a seat of a vehicle. As illustrated, inside a vehicle, a seat 102 sits on a floor 104. A tray table 108 connects to a release mechanism 106 via an arm 110. The release mechanism is coupled to a base 112 attached to the floor 104. The tray table 108 is deployed to be in an open position and extends upwardly above the seat 102. When a passenger (not shown) sits on the seat 102, the tray table 108 is in front of the passenger.

Figure 1B:
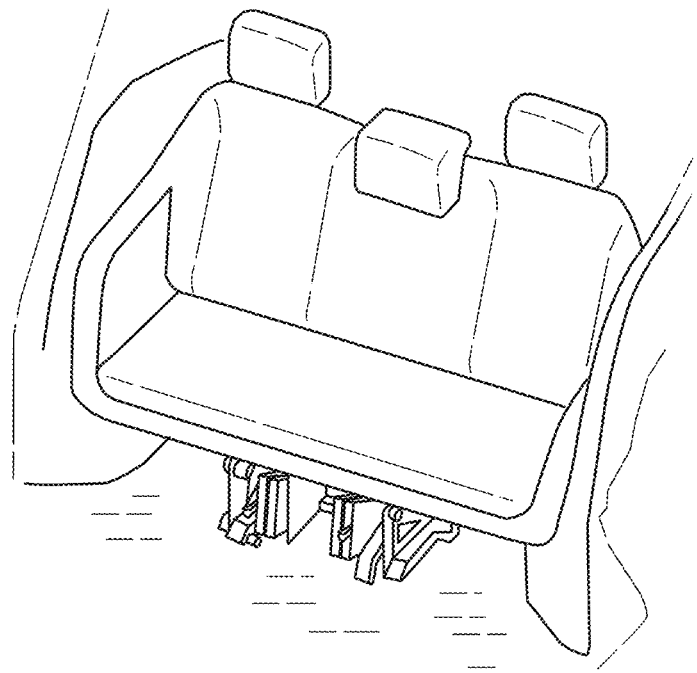
FIG. 1B illustrates a perspective view of a tray table being folded, according to some aspects of the disclosed technology.

FIG. 1B illustrates a perspective view of a tray table being folded. The tray table 108 is in a closed position. The tray table 108 and the arm 110 can be folded to fit underneath the seat 102 of the vehicle.

FIG. 1C illustrates a top view of a vehicle with a tray table being deployed. As shown, a vehicle 100 includes a front 114, a rear cargo area 116 opposite to the front 114, and a door on each side of the vehicle positioned between the front 114 and the rear 116. The vehicle 100 also includes a side door 116A on a left side of the vehicle 100 and a side door 116B on a right side of the vehicle 100.

The vehicle 100 also includes a row of front seats 122 near the front 114 and a row of backseats 122 near the rear cargo area 118, which are placed inside the vehicle 100. The backseats 120 and the front seats 122 face each other. The tray tables 108 are deployed in front of both the front seats 122 and the backseats 120, and positioned near the middle of the vehicle 100. The tray tables 108 in front of the backseats 120 are referred to as forward facing tray tables. The tray tables 108 in front of the front seats 122 are referred to backward facing tray tables. It is understood that other seat and/or tray table configurations may be implemented, without departing from the scope of the disclosed technology.

FIG. 1D illustrates a top view of the vehicle 100 with the tray tables 108 of FIG. 1C being folded underneath the seat. As shown, the tray tables 108 cannot be seen when they are folded or in a closed position.

It will be appreciated by those skilled in the art that the number of tray tables 108 and positions of the tray tables 108 may vary. For example, the tray table 108 may be deployed from other interior surfaces other than the floor, as illustrated. The tray tables 108 may be coupled to any other interior structure including seats, ceilings, or sides of the vehicle 100.

Figure 2:
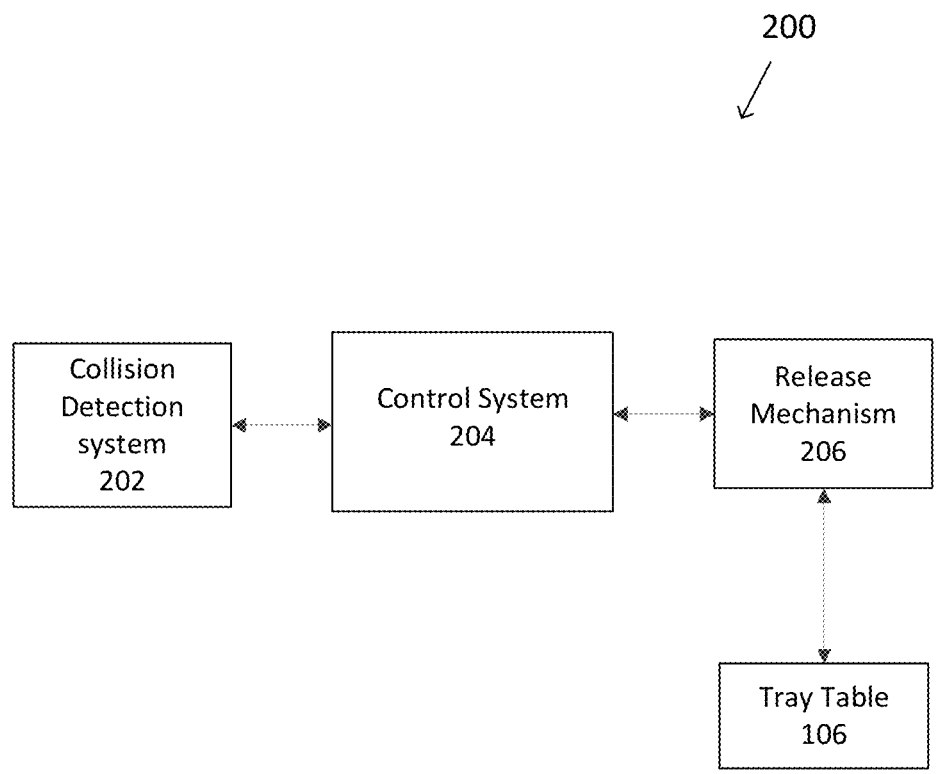
FIG. 2 is a block diagram illustrating a safety apparatus, according to some aspects of the disclosed technology.

FIG. 2 is a block diagram illustrating a safety apparatus. A safety apparatus 200 includes a tray table 108 coupled to an interior surface of a vehicle 100 via a release mechanism 206. The safety apparatus 200 also includes a collision detection system 202 which is communicatively coupled to the release mechanism 206 if the tray table 108 is in an open position or deployed, and is not communicatively coupled to the release mechanism 206 if the tray table 108 is in a closed position. In other words, the collision detection system 202 is engaged with the release mechanism 206 if the tray table 108 is in an open position or deployed. The collision detection system 202 disengages with the release mechanism 206 if the tray table is in a closed position.

The disclosed safety apparatus 200 uses a general intelligence and safety strategy of the vehicle, such as airbag sensors or accelerators associated with emergency braking, which are examples of the collision detection system 202. The collision detection system 202 is configured to engage with the release mechanism 206 if the tray table 108 is in an open position, and to de-couple the tray table 108 from the interior surface of the vehicle 100 if a collision is detected with respect to the vehicle 100. The tray table 108 is coupled to an interior surface of a vehicle 100 via the release mechanism 206.

The collision detection system 202 may include any systems, or combinations of systems, that can be used to predict and/or detect a vehicle collision event. In some aspects, the collision detection system 202 may include an airbag sensor. In some aspects, the collision detection system 202 may include one or more sensors, such as accelerometers, inertial measurement units (IMUs), radars, Light Detection and Ranging (LiDAR) sensors, and/or cameras, that may be used to collect data that can be used to infer (or predict) the occurrence of a collision event.

In some variations, the collision detection system 202 can be directionally cognitive using the autonomous vehicle sensors and autonomous vehicle (AV) software. For example, the AV software in the control system 204 may choose to release specific tray tables based on the direction of the crash. By way of example, control system 204 may be configured to release tray tables associated with one row and not for another row, depending on the direction of the crash. For a rear collision, the AV software in the control system 204 may not release forward facing tray tables in front of the backseat 120 that may not be hit by passengers, but may release the backward facing tray tables in front of the front seat 122, as illustrated in FIG. 1C. For a front collision, the AV software in the control system 204 may release the forward facing tray tables in front of the back seat 120 that may be hit by passengers, but may not release the backward facing tray tables in front of the front seat 122, as illustrated in FIG. 1C.

In some variations, the vehicle 100 is an autonomous vehicle, which includes various sensors and computing components to assist with various operations of the autonomous vehicle. Non-limiting examples of sensors that can be implemented by an autonomous vehicle include radar sensors, LiDAR sensors, image sensors, IMUs, audio sensors, depth sensors, among others. In some examples, the sensors can be housed in one or more sensor platforms. A sensor platform can house various components such as sensors and/or other electronic components. In some cases, the sensors and/or other electronic components in the sensor platform may be packed in a small space, which can negatively impact air flow and heat dissipation, as well as other thermal management conditions. The autonomous vehicle and the various sensors and computing components of the autonomous vehicle may also generate heat. Moreover, thermal management and maintaining the sensors and computing components of the autonomous vehicle from overheating or melting can be very challenging, particularly in warmer environments, in direct sunlight, and/or lack of airflow (e.g., a vehicle stopped at a red light on a day with no wind).

In some variations, the collision detection system may include crash prediction based upon a thermal model. For example, the thermal model may predict an overheating of the sensor platform on the autonomous vehicle based upon routing data and local weather data. The overheating may cause an emergency stop of the vehicle.

The release mechanism 206 can de-couple the tray table 108 from the interior surface of the vehicle 100, such as a floor or a seat, or unlock the tray table 108 from its locked position such that the tray table 108 can fall down by gravity. As such, the passenger in the vehicle 100 may avoid hitting the tray table 108 and being injured during a crash event.

The safety apparatus 200 may also include a control system 204 coupled between the collision detection system 202 and the release mechanism 206. The release mechanism 206 may include a latching solenoid, which operates, based upon an electro-mechanical mechanism, to electrically control a mechanical operation, e.g., de-coupling or breaking away of the tray table 108. The control system 204 may control the power to the latching solenoid based upon the input from the collision detection system 202. For example, the collision detection system 202 may detect a crash event or a collision event and communicate the crash event to the control system 204. The control system 204 may shut down the power to the latching solenoid such that the tray table 108 may de-couple from an interior structure of the vehicle 100 or may break away from a portion of a table structure. If the collision detection system 202 does not detect a crash event, the control system 204 may keep the power to the solenoid, such that the tray table 108 remains in an open position.

In some variations, the collision detection system 202 is further configured to disengage with the release mechanism 206 if the tray table 108 is in a closed position. In other words, the collision detection system 202 is not communicatively coupled to the release mechanism 206 if the tray table 108 is in a closed position.

In some variations, the release mechanism comprises a solenoid.

In some variations, the release mechanism 206 may include a solenoid coupled to a locking hinge. The solenoid is controlled by electric power such that the locking hinge may lock the tray table 108 in a locked position with electric power and unlock the tray table 108 or de-couple the tray table 108 from an interior surface of the vehicle 100 without electric power.

As an example, the safety apparatus 200 may include a tray table surface locking solenoid, which includes a dual input through an "AND" logic to enable the solenoid to engage. A first input is from a user to pull up the tray table 108 to deploy the tray table 108. A second input is from the collision detection system 202, which is activated if a crash or a collision event occurs, or is not activated if no crash or collision event occurs.

The safety apparatus 200 may operate in three operational scenarios as described below.

FIG. 3A shows a logic of a circuitry for a first operational scenario of the safety apparatus. The first operational scenario demonstrates the tray table 108 being stowed or closed when the vehicle operates normally. As shown in FIG. 3A, a tray table system 310 includes the tray table locking solenoid 320 and a deploy switch 308. The deploy switch 308 is open and the tray table is closed. The collision detection system 302 communicates with control system 304 that no crash or collision event has occurred. However, there is no communication between the control system 304 with the tray table locking solenoid 320. There is no electric power to the tray table locking solenoid, as a high current relay switch 306 is open. The collision detection system 304 does not communicate with the tray table locking solenoid 320 when the tray table 108 is in a closed position. FIG. 3B shows a logic of a circuitry for a second operational scenario of the safety apparatus. The second operational scenario demonstrates the tray table 108 being deployed when the vehicle operates normally. As shown in FIG. 3B, the control system 304 receives a signal from the collision detection system 304 that no crash has occurred. The deploy switch 308 is closed when the tray table 108 is deployed or in an open position. The control system 304 instructs to close the deploy switch 308 via a low current line 312. The control system 304 may also determine if the deploy switch 308 is closed via the low current line 312. The control system 304 may also instruct to close the high current relay switch 306 to power the solenoid 320 via a high current line 314. The tray table 108 is deployed in an open position and may be locked in the open position. The tray table 108 may include a release mechanism including the solenoid 320. When the solenoid 320 is powered, the tray table does not break away and remains open.

FIG. 3C shows a logic of a circuitry for a third operational scenario of the safety apparatus. The third operational scenario demonstrates the tray table 108 being deployed when a vehicle collision occurs. As shown, the tray table deploy switch 308 is on. The control system 304 is in communication with the tray table deploy switch 308 and is aware that the tray table 108 is in an open position or deployed. The control system 304 receives a signal from the collision detection system 304 that a crash event or a collision event has occurred. The control system 304 is configured to open the high current relay switch 306 through the high current line 314 to shut down electric power to the solenoid 320. In this scenario, the tray table 108 may be unlocked from its locked position without power and may fall down by gravity. The tray table 108 may also de-couple from the interior surface, such as the floor or a seat, of the vehicle.

Figure 4:
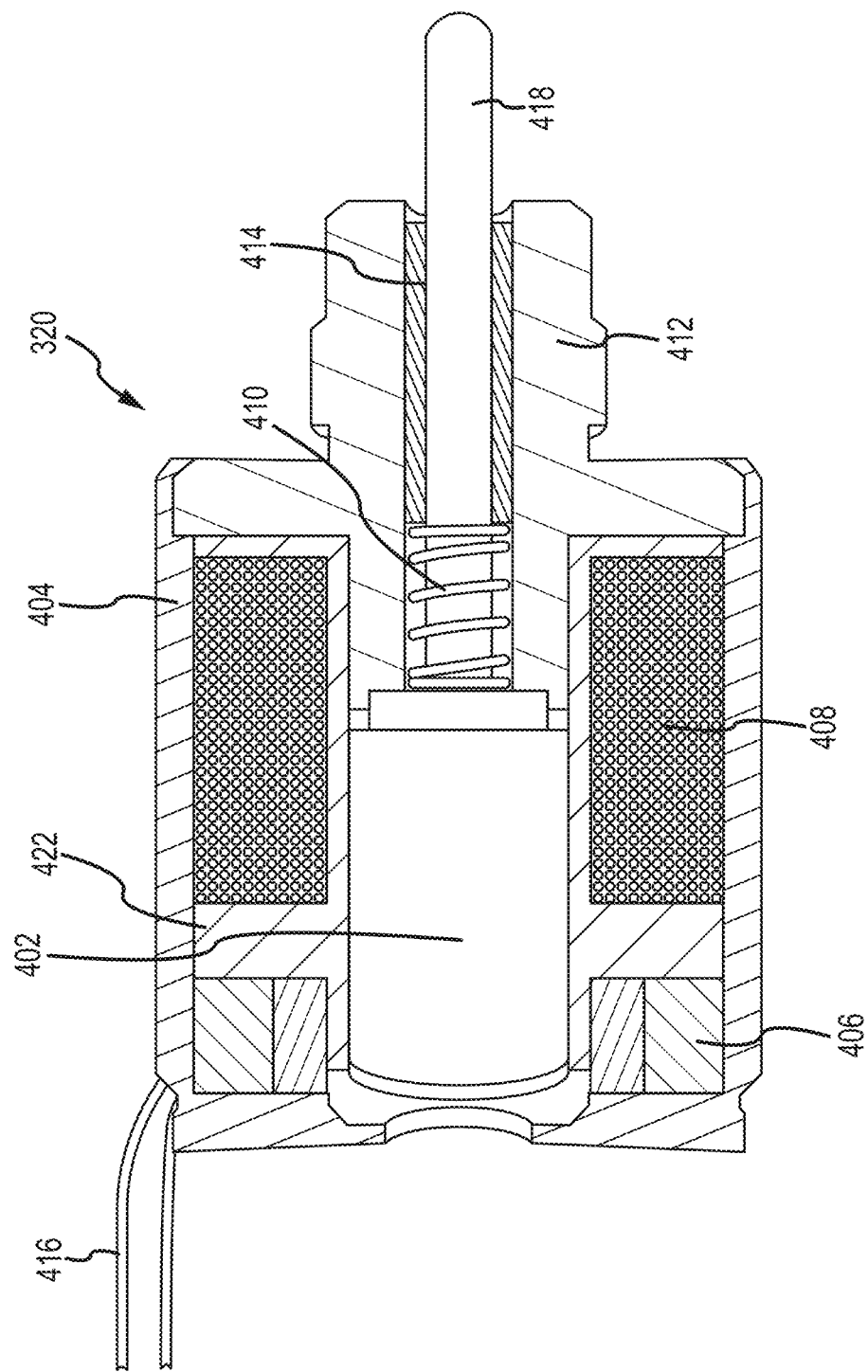
FIG. 4 shows a cross-sectional view of the solenoid, according to some aspects of the disclosed technology.

The structure and operation of the solenoid 320 are described below. FIG. 4 shows a cross-sectional view of the solenoid 320. The solenoid 320 includes a solenoid pin 418, which may extend when the solenoid 320 has electric power, and may retract when the solenoid 320 has no electric power. The solenoid 320 includes a permanent magnet 406 and a coil 408 disposed within a housing 404. The solenoid 320 utilizes an electrical current pulse through the coils 308 and the permanent magnet 406 to maintain a set position without the constant application of an electrical current.

The solenoid 320 also includes the solenoid pin 418 extending through a pole 412, which may be a stationary pole. The solenoid 320 also includes a spring 410 coupled between an armature 402 and a stopper 414. The armature 402 is attached to the pole 412 within a solenoid body 422 that may be attached to an inside wall 420 of the housing 404.

Once the armature 402 moves toward the pole 412 and is in contact with the pole 412, the armature 402 remains in this position without any further electrical power input. The armature 402 is held in this position by the permanent magnet 406. To release the solenoid 320 from this held position, the attraction from the permanent magnet 406 needs to be canceled by sending an electric current back through the coils 408 in an opposite direction.

The solenoid 320 utilizes the permanent magnets 406 in conjunction with the solenoid coils 408 to maintain the position of the armature 402 with no current applied. The permanent magnet 406 generates a magnetic flux to attract the armature 402 and the pole 412 with no electric power applied. When a short pulse of the electrical current from power line 416 is applied to the coils 408, the resulting magnetic flux generated by the coils 408 can either add to or subtract from the magnet flux of the permanent magnet 406, depending on the polarity of the applied electric current.

In applications where the load acts to extend the armature 402 away from the pole 412, the solenoid 320 can maintain an extended or a retracted position without consuming continuous electric power. In applications where there is no load to act on the armature 402, the spring 410 can be used to hold the armature 402 in an extended position.

The pulse of electric current can be applied to generate a magnetic flux to add to the permanent magnet 406 and move the armature 402 toward the pole 412. When the electric current is removed, the armature 402 is held in a latched position by the permanent magnet 406. Conversely, applying a reverse polarity pulse may cancel the magnetic flux of the permanent magnet and allow the spring 410 to release the armature 402, and move to an extended position.

The solenoid 320 may be most efficient when the pulse time is short compared to the hold time. While the solenoid 320 can be used in both short and long stroke applications, the stroke of the solenoid 320 may be reduced to improve efficiency.

In an embodiment, the release mechanism 206 may include the solenoid 320. The solenoid pin 418 may extend to lock the tray table 108 when the tray table 108 is deployed. The solenoid pin 418 can extend when the coils 308 are energized with the electric power supplied from power line 416. The solenoid pin 418 may retract when the solenoid 320 has no electric power. For example, the solenoid pin 418 retracts to a de-latched position, when the electric power to the coils 408 are de-energized. The tray table 108 may de-couple from an interior surface of the vehicle and may fall down toward the floor.

Figure 5A:
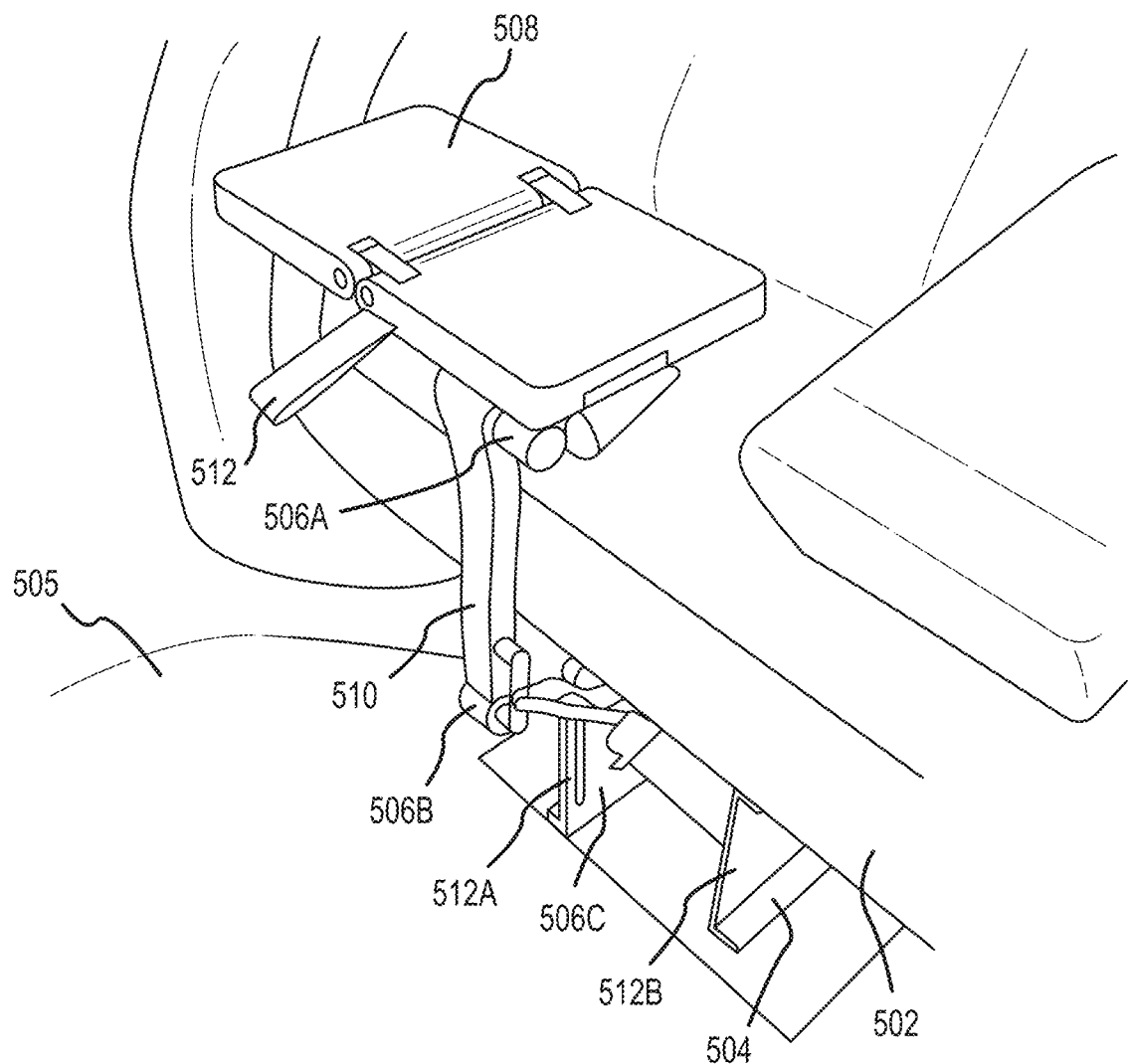
FIG. 5A illustrates a tray table structure disposed within a vehicle with a tray table in an open position, according to some aspects of the disclosed technology.
Figure 5B:
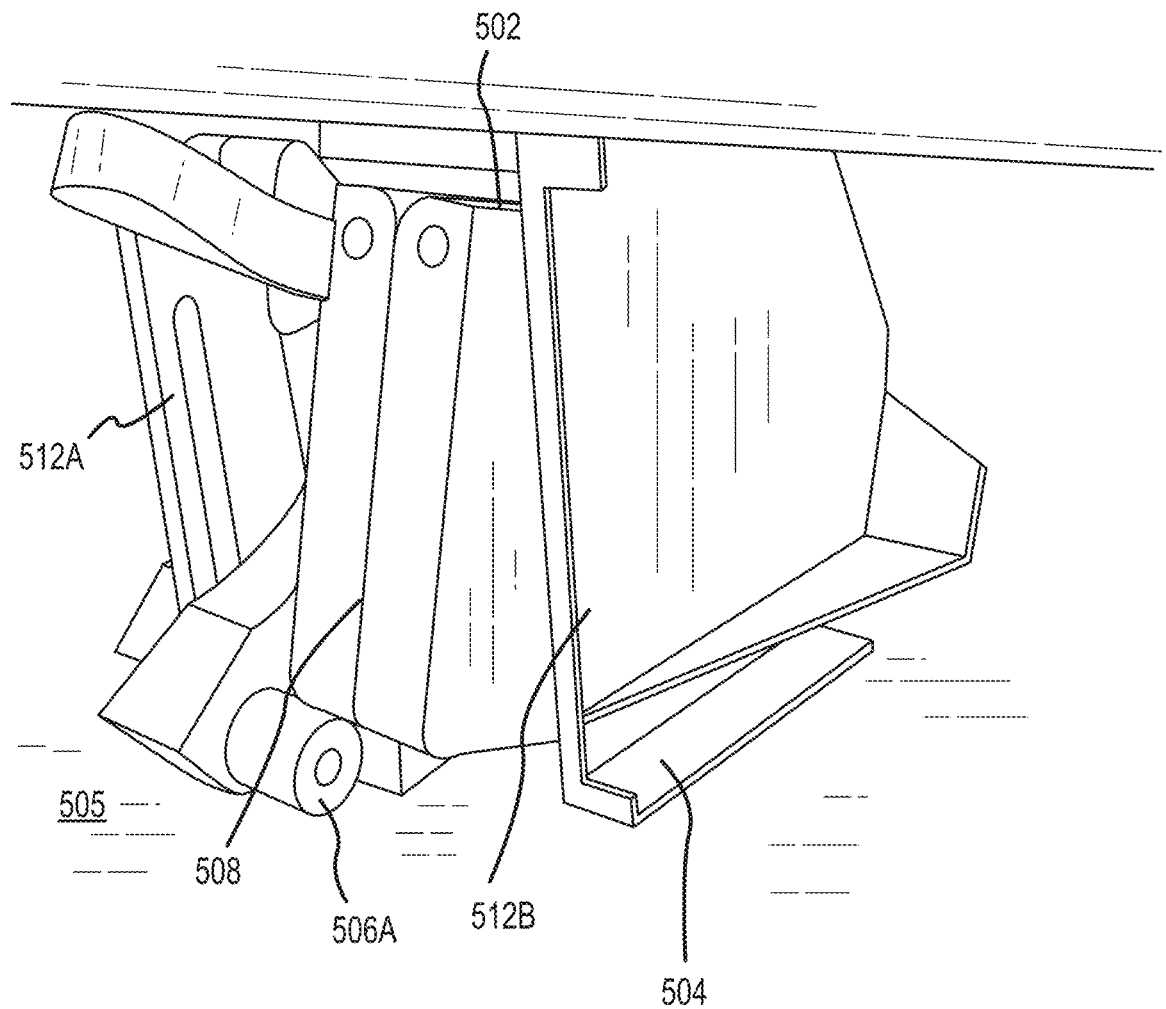
FIG. 5B illustrates the tray table structure disposed within the vehicle with the tray table of FIG. 5A in a closed position, according to some aspects of the disclosed technology.

FIG. 5A illustrates a tray table structure disposed within a vehicle with a tray table in an open position. As shown, a tray table 508 is in an open position extending above a seat 502 of the vehicle. A tray table structure 500 includes a base 504 attached to an interior surface 505, such as a floor, among others. The tray table structure 500 also includes a tray table or tray table surface 508 supported by an arm 510, which is coupled to a first side 512A via a joint 514. The first side 512A attaches to the base 504 and extends upward or vertically from the base 504. A second side 512B is spaced apart from the side 512A to allow the tray table 508 to be stored between the first side 512A and the second side 512B. The second side 512B also attaches to the base 504 and extends upward or vertically from the base 504. The tray table structure 500 may also include a strip 512 coupled to the tray table 508. The strip 512 allows a user to manually pull out the tray table from a closed position as shown in FIG. 5B.

The tray table structure 500 may also include a first folding mechanism 506A coupled to the tray table 508. The tray table structure 500 may also include a second folding mechanism 506B coupled to an end of the arm 510, opposite to the first folding mechanism 506A, to a connection segment. The tray table structure 500 may also include a third folding mechanism 506C that couples the connection segment to the side 512A.

At least one of the folding mechanisms 506A, 506B, or 506C may include a release mechanism that allows the tray table to break away or fall down by gravity when a crash event occurs. In one example, the folding mechanism 506B may include a release mechanism.

As an example, the release mechanism may include a solenoid 320 including a solenoid pin 418, which may retract to release the tray table 508 from its locked position without electric power, such as during a crash event. As a result, the tray table 508 may break away from a portion of the tray table structure 500 or de-couple from an interior portion of the vehicle, such as floor, seat, or side.

FIG. 5B illustrates the tray table structure disposed within the vehicle with the tray table of FIG. 5A in a closed position. As shown, the tray table 508 is in a closed position and packed under the seat 502. The solenoid pin 418 is positioned substantially parallel to the floor and may extend horizontally to lock the tray table 508 in the closed position with electric power.

The solenoid pin 418 may be in a latched position when there is electric power to the solenoid 320. When the solenoid pin 418 extends out, the tray table 508 is locked in an open position.

The solenoid pin 418 may be in a de-latched position when there is no electric power to the solenoid 320. When the solenoid pin 418 retracts, the tray table 508 is unlocked or released to break away from a portion of the tray table structure 500 or de-couple from an interior portion of the vehicle, such as the floor, and fall down toward the floor by gravity.

In some variations, the tray table is very soft. The tray table may have an adequate stiffness and a weight bearing capacity without compromising safety of occupants or passengers in the vehicle during crashes.

In some variations, the tray table or tray table surface is much softer than the tray tables on an airplane. The tray table surface may not be formed of a solid plastic or polymer. Instead, the tray table may be constructed of foam (e.g., poly-urethane foam), rubber, or mattress-like consistency material. The soft tray table may absorb energy when a passenger's head or nose hits the soft tray table. When the soft tray table is formed of the soft material, the soft tray table may not be able to carry heavy loads. In other words, the soft tray table does not provide a rigid table surface to place items.

For example, a passenger may sit in a backseat and have a laptop on the tray table when the vehicle navigates on a road. A front of the vehicle may experience a crash event. A passenger sitting in the back seat may hit their head on the tray table during the crash event. If the tray table is rigid, the passenger may get hurt. However, if the tray table is soft, the passenger may not receive serious injuries.

In some variations, the tray table may have a bulk modulus of less than 1 GPa, but greater than 0.5 GPa.

In some variations, the tray table may have a bulk modulus of less than 0.9 GPa.

In some variations, the tray table may have a bulk modulus of less than 0.8 GPa.

In some variations, the tray table may have a bulk modulus of less than 0.7 GPa.

In some variations, the tray table may have a bulk modulus of less than 0.6 GPa.

In some variations, the tray table may have a bulk modulus of equal to or greater than 0.5 GPa. In some variations, the tray table may have a bulk modulus of equal to or greater than 0.6 GPa. In some variations, the tray table may have a bulk modulus of equal to or greater than 0.7 GPa. In some variations, the tray table may have a bulk modulus of equal to or greater than 0.8 GPa. In some variations, the tray table may have a bulk modulus of equal to or greater than 0.9 GPa.

In some variations, the tray table may be attached to the side of the seat such that the tray table may be used as an armrest.

In some variations, the tray table may have a built-in air bag.

Figure 6:
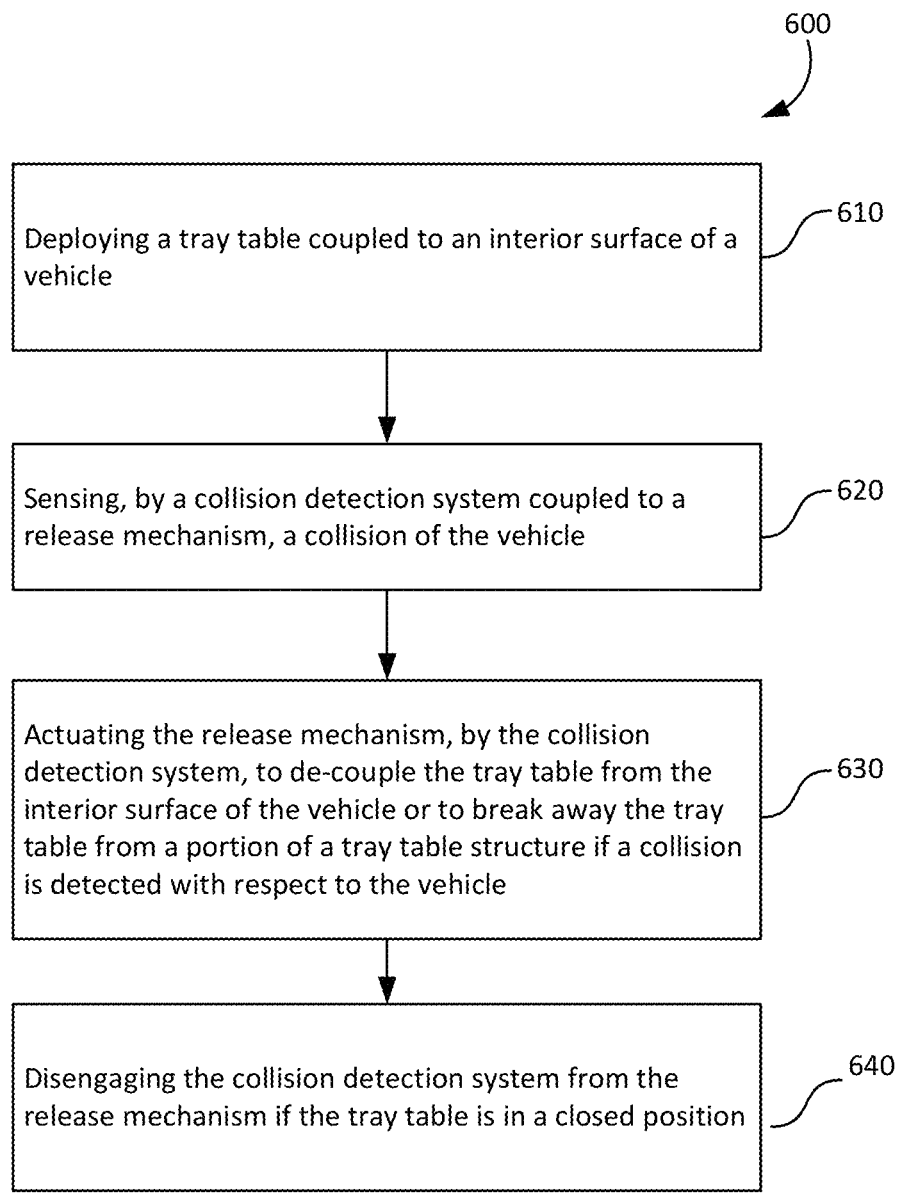
FIG. 6 illustrates an example flow chart illustrating the steps for operating the safety apparatus, according to some aspects of the disclosed technology.

FIG. 6 illustrates an example flow chart illustrating the steps for operating the safety apparatus. Although an example method 600 depicts a particular sequence of operations, the sequence may be altered without departing from the scope of the present disclosure. For example, some of the operations depicted may be performed in parallel or in a different sequence that does not materially affect the function of the method 600. In other examples, different components of an example device or system that implements the method 600 may perform functions at substantially the same time or in a specific sequence.

According to some examples, the method 600 may include deploying a tray table disposed over an interior surface of a vehicle at block 610. For example, the safety apparatus as illustrated in FIG. 2 may deploy a tray table disposed over an interior surface of a vehicle.

According to some examples, the method 600 may include sensing, by a collision detection system coupled to a release mechanism, a collision of the vehicle at block 620. For example, the safety apparatus 200 as illustrated in FIG. 2 may sense, by the collision detection system 202 coupled to the release mechanism 206, a collision of the vehicle.

In some variations, the release mechanism comprises a solenoid.

In some variations, the release mechanism includes a friction joint. The friction joint can be a tubular component placed between a shaft and a hub. Its main function is to create surface pressure between the shaft and hub, joining the two parts together by friction. Using this method, both torque and axial forces can be transmitted at the same time. When a crash event occurs, a passenger may put weight on the friction joint and cause the tray table to break away from a portion of the tray table structure.

In some variations, the collision detection system is communicatively coupled to a control system, and wherein the control system is configured to control a delivery of power to the solenoid.

In some variations, the collision detection system may include an airbag sensor, one or more accelerometers, or a combination thereof.

In some variations, the collision detection system may include a camera, a radar, a Light Detection and Ranging (LiDAR) sensor, a Vehicle-to-Everything (V2X) chipset, or a combination thereof.

In some variations, the collision detection system may include crash prediction based upon a model.

According to some examples, the method 600 may include engaging with the release mechanism if the tray table is in an open position, by a collision detection system, or actuating the release mechanism, by the collision detection system, to de-couple the tray table from the interior surface of the vehicle if a collision is detected with respect to the vehicle at block 630. For example, the safety apparatus 200 as illustrated in FIG. 2 may engage with the release mechanism 206 if the tray table 208 is in an open position, by the collision detection system 202, or actuate the release mechanism 206, by the collision detection system 202, to de-couple the tray table 208 from the interior surface of the vehicle if a collision is detected with respect to the vehicle.

According to some examples, the method 600 may include disengaging the collision detection system from the release mechanism if the tray table is in a closed position at block 640. For example, the safety apparatus 200 illustrated in FIG. 2 may disengage the collision detection system 202 from the release mechanism 206 if the tray table 208 is in a closed position.

According to some examples, the method 600 may include coupling the collision detection system to a control system configured to control a delivery of power to the solenoid at block 650. For example, the safety apparatus 200 illustrated in FIG. 2 may couple the collision detection system 202 to the control system 204 configured to control a delivery of power to the solenoid 320 as illustrated in FIG. 3.

As an example, when the front of the vehicle experiences a crash event with another vehicle, human, or other object, an airbag sensor of the vehicle can detect the crash event before the crash propagates to the back seat of the vehicle. The airbag sensor can send a signal to the control system 204, which can open the high current relay switch to cut the power to the solenoid, such that the tray table can break away from an interior structure of the vehicle, such as a floor.

In some variations, the vehicle is an autonomous vehicle (AV).

Figure 7:
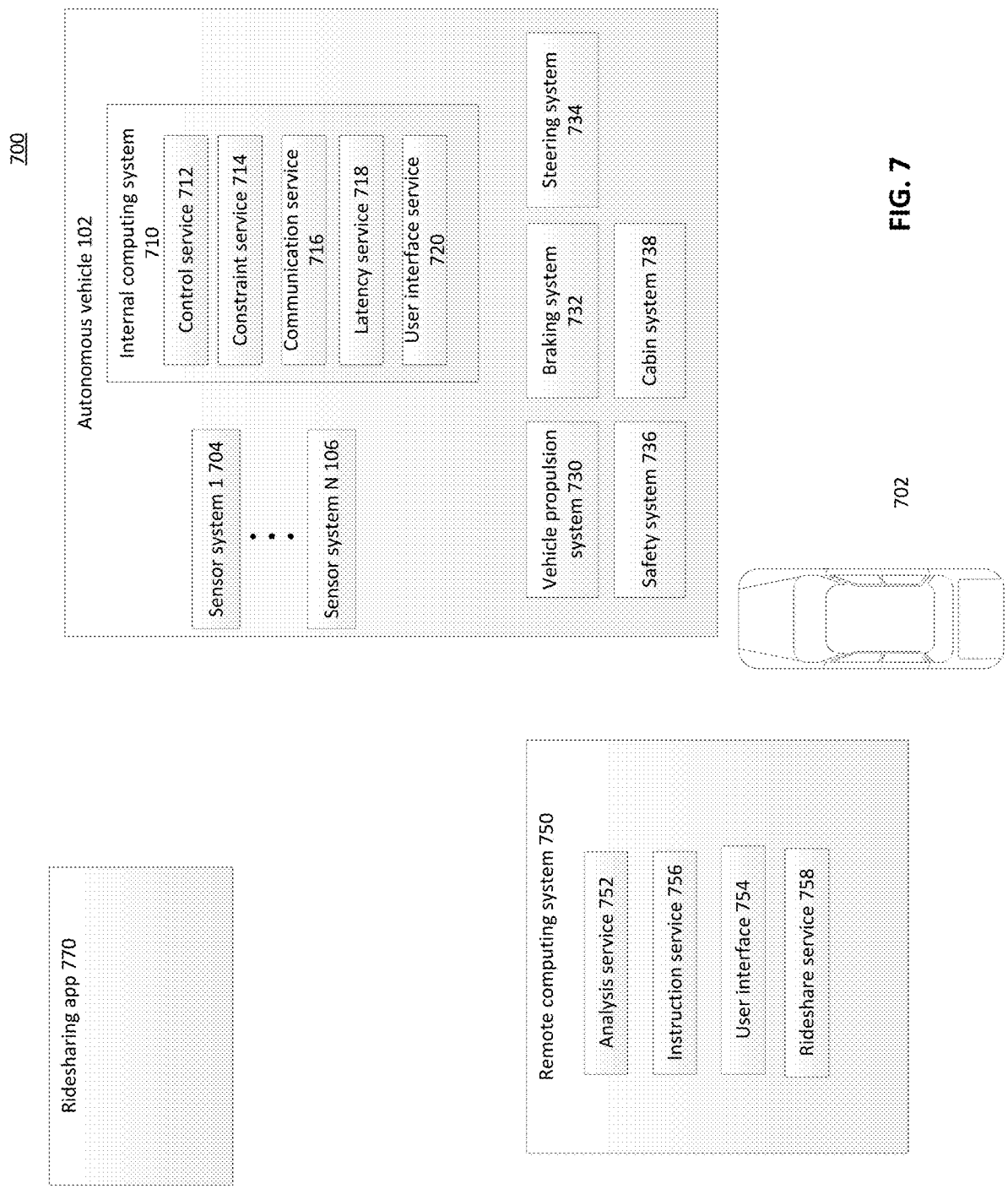
FIG. 7 illustrates an example environment that includes an autonomous vehicle in communication with a remote computing system, according to some aspects of the disclosed technology.

FIG. 7 illustrates environment 700 that includes an autonomous vehicle 702 in communication with a computing system 750. The autonomous vehicle 702 can navigate about roadways without a human driver based upon sensor signals output by sensor systems 704-706 of the autonomous vehicle 702. The autonomous vehicle 702 includes a plurality of sensor systems 704-706 (a first sensor system 702 through an Nth sensor system 704). The sensor systems 704-706 are of different types and are arranged about the autonomous vehicle 702. For example, the first sensor system 704 may be a camera sensor system and the Nth sensor system 706 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 702 further includes several mechanical systems that are used to effectuate appropriate motion of the autonomous vehicle 702. For instance, the mechanical systems can include but are not limited to, a vehicle propulsion system 730, a braking system 732, and a steering system 734. The vehicle propulsion system 730 may include an electric motor, an internal combustion engine, or both. The braking system 732 can include an engine brake, brake pads, actuators, and/or any other suitable componentry that is configured to assist in decelerating the autonomous vehicle 702. The steering system 734 includes suitable componentry that is configured to control the direction of movement of the autonomous vehicle 702 during navigation.

The autonomous vehicle 702 further includes a safety system 736 that can include various lights and signal indicators, parking brake, airbags, etc. The autonomous vehicle 702 further includes a cabin system 738 that can include cabin temperature control systems, in-cabin entertainment systems, etc.

The autonomous vehicle 702 additionally comprises an internal computing system 710 that is in communication with the sensor systems 704-706 and the mechanical systems 730, 732, 734. The internal computing system includes at least one processor and at least one memory having computer-executable instructions that are executed by the processor. The computer-executable instructions can make up one or more services responsible for controlling the autonomous vehicle 702, communicating with remote computing system 750, receiving inputs from passengers or human co-pilots, logging metrics regarding data collected by sensor systems 704-706 and human co-pilots, etc.

The internal computing system 710 can include a control service 712 that is configured to control operation of the vehicle propulsion system 206, the braking system 208, the steering system 210, the safety system 736, and the cabin system 738. The control service 712 receives sensor signals from the sensor systems 202-204 as well communicates with other services of the internal computing system 710 to effectuate operation of the autonomous vehicle 702. In some embodiments, control service 712 may carry out operations in concert one or more other systems of autonomous vehicle 702.

The control service 712 may include the control system 204 as illustrated in FIG. 2 to communicate with the sensors including airbag sensors or accelerators. The control system 204 may also communicate with the release mechanism 206 via high current relay switch 306.

The internal computing system 710 can also include a constraint service 714 to facilitate safe propulsion of the autonomous vehicle 702. The constraint service 716 includes instructions for activating a constraint based on a rule-based restriction upon operation of the autonomous vehicle 702. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 712

The internal computing system 710 can also include a communication service 716. The communication service can include both software and hardware elements for transmitting and receiving signals from/to the remote computing system 250. The communication service 716 is configured to transmit information wirelessly over a network, for example, through an antenna array that provides personal cellular (long-term evolution (LTE), 3G, 5G, etc.) communication.

In some embodiments, one or more services of the internal computing system 710 are configured to send and receive communications to remote computing system 750 for such reasons as reporting data for training and evaluating machine learning algorithms, requesting assistance from remoting computing system or a human operator via remote computing system, software service updates, ridesharing pickup and drop off instructions etc.

The internal computing system 710 can also include a latency service 718. The latency service 718 can utilize timestamps on communications to and from the remote computing system 750 to determine if a communication has been received from the remote computing system 750 in time to be useful. For example, when a service of the internal computing system 710 requests feedback from remote computing system 750 on a time-sensitive process, the latency service 718 can determine if a response was timely received from remote computing system 750 as information can quickly become too stale to be actionable. When the latency service 718 determines that a response has not been received within a threshold, the latency service 718 can enable other systems of autonomous vehicle 702 or a passenger to make necessary decisions or to provide the needed feedback.

The internal computing system 710 can also include a user interface service 120 that can communicate with cabin system 738 in order to provide information or receive information to a human co-pilot or human passenger. In some embodiments, a human co-pilot or human passenger may be required to evaluate and override a constraint from constraint service 714, or the human co-pilot or human passenger may wish to provide an instruction to the autonomous vehicle 702 regarding destinations, requested routes, or other requested operations.

As described above, the remote computing system 750 is configured to send/receive a signal from the autonomous vehicle regarding reporting data for training and evaluating machine learning algorithms, requesting assistance from remoting computing system or a human operator via the remote computing system 750, software service updates, ridesharing pickup and drop off instructions, etc.

The remote computing system 750 includes an analysis service 752 that is configured to receive data from autonomous vehicle 702 and analyze the data to train or evaluate machine learning algorithms for operating the autonomous vehicle 702. The analysis service 752 can also perform analysis pertaining to data associated with one or more errors or constraints reported by autonomous vehicle 702.

The remote computing system 750 can also include a user interface service 754 configured to present metrics, video, pictures, sounds reported from the autonomous vehicle 702 to an operator of remote computing system 750. User interface service 754 can further receive input instructions from an operator that can be sent to the autonomous vehicle 702.

The remote computing system 750 can also include an instruction service 756 for sending instructions regarding the operation of the autonomous vehicle 702. For example, in response to an output of the analysis service 752 or user interface service 754, instructions service 756 can prepare instructions to one or more services of the autonomous vehicle 702 or a co-pilot or passenger of the autonomous vehicle 702.

The remote computing system 750 can also include a rideshare service 758 configured to interact with ridesharing applications 770 operating on (potential) passenger computing devices. The rideshare service 758 can receive requests to be picked up or dropped off from passenger ridesharing app 770 and can dispatch autonomous vehicle 702 for the trip. The rideshare service 758 can also act as an intermediary between the ridesharing app 770 and the autonomous vehicle wherein a passenger might provide instructions to the autonomous vehicle to 702 go around an obstacle, change routes, honk the horn, etc.

Figure 8:
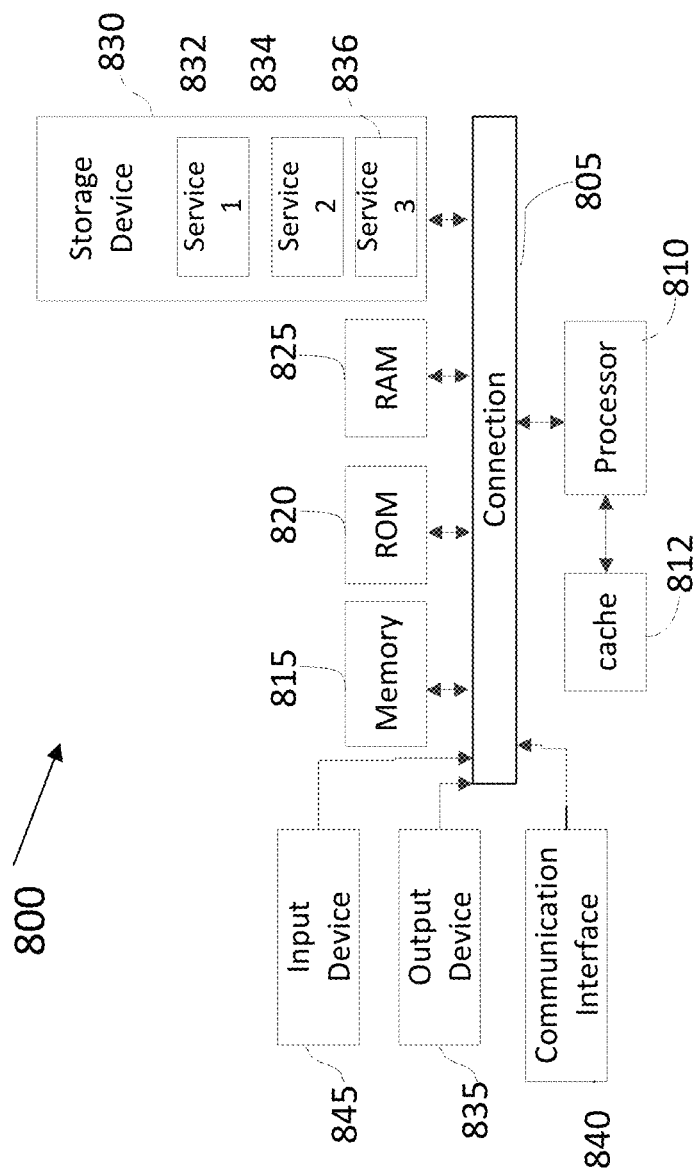
FIG. 8 shows an example of computing system for implementing certain aspects of the present technology.

FIG. 8 shows an example of computing system 800, which can be for example any computing device making up internal computing system 710, remote computing system 750, (potential) passenger device executing rideshare app 770, or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read-only memory (ROM) 820 and random access memory (RAM) 825 to processor 810. Computing system 800 can include a cache of high-speed memory 812 connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement, and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A safety apparatus, comprising:
   a tray table coupled to an interior surface of a vehicle via a release mechanism; and
   a collision detection system communicatively coupled to the release mechanism if the tray table is in an open position, wherein the collision detection system is configured to detach the tray table from the interior surface of the vehicle when a collision is detected with respect to the vehicle.

2. The safety apparatus of claim 1, wherein the collision detection system is not communicatively coupled with the release mechanism if the tray table is in a closed position.

3. The safety apparatus of claim 1, wherein the release mechanism comprises a solenoid.

4. The safety apparatus of claim 3, wherein the collision detection system is coupled to a control system, and wherein the control system is configured to control a delivery of power to the solenoid.

5. The safety apparatus of claim 1, wherein the collision detection system comprises an airbag sensor, one or more accelerometers, or a combination thereof.

6. The safety apparatus of claim 1, wherein the collision detection system comprises: a camera, a radar, a Light Detection and Ranging (LiDAR) sensor, a Vehicle-to-Everything (V2X) chipset, or a combination thereof.

7. The safety apparatus of claim 1, wherein the vehicle is an autonomous vehicle (AV).

8. A safety apparatus comprising:
- a collision detection system;
- a release mechanism for a tray table coupled to an interior surface of a vehicle; and
- a control system communicatively coupled between the collision detection system and the release mechanism if the tray table is in an open position, wherein the collision detection system, via the control system, detaches the tray table from the interior surface of the vehicle when a collision is detected with respect to the vehicle.

9. The safety apparatus of claim 8, wherein the collision detection system is further configured to disengage with the release mechanism if the tray table is in a closed position.

10. The safety apparatus of claim 8, wherein the release mechanism comprises a solenoid.

11. The safety apparatus of claim 10, wherein the collision detection system is coupled to a control system, and wherein the control system is configured to control a delivery of power to the solenoid.

12. The safety apparatus of claim 8, wherein the collision detection system comprises an airbag sensor, one or more accelerometers, or a combination thereof.

13. The safety apparatus of claim 8, wherein the collision detection system comprises: a camera, a radar, a Light Detection and Ranging (LiDAR) sensor, a Vehicle-to-Everything (V2X) chipset, or a combination thereof.

14. The safety apparatus of claim 8, wherein the vehicle is an autonomous vehicle (AV).

15. A method comprising:
- deploying a tray table coupled to an interior surface of a vehicle;
- sensing, by a collision detection system coupled to a release mechanism, a collision of the vehicle; and
- actuating the release mechanism, by the collision detection system, to detach the tray table from the interior surface of the vehicle when a collision is detected with respect to the vehicle.

16. The method of claim 15, further comprising disengaging the collision detection system from the release mechanism if the tray table is in a closed position.

17. The method of claim 15, wherein the release mechanism comprises a solenoid.

18. The method of claim 17, further comprising coupling the collision detection system to a control system configured to control a delivery of power to the solenoid.

19. The method of claim 15, wherein the collision detection system comprises an airbag sensor, one or more accelerometers, or a combination thereof.

20. The method of claim 15, wherein the collision detection system comprises: a camera, a radar, a Light Detection and Ranging (LiDAR) sensor, a Vehicle-to-Everything (V2X) chipset, or a combination thereof.

* * * * *